US007973783B2

(12) United States Patent
Takahashi et al.

(10) Patent No.: US 7,973,783 B2
(45) Date of Patent: Jul. 5, 2011

(54) POWER CIRCUIT, DISPLAY DEVICE AND MOBILE TERMINAL IMPLEMENTING A BOOSTING CIRCUIT

(75) Inventors: Yusuke Takahashi, Kanagawa (JP); Takayuki Nakanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 11/882,341

(22) Filed: Aug. 1, 2007

(65) Prior Publication Data

US 2008/0036520 A1 Feb. 14, 2008

(30) Foreign Application Priority Data

Aug. 10, 2006 (JP) ................................ 2006-218130

(51) Int. Cl.
*G06F 3/038* (2006.01)

(52) U.S. Cl. ....................................... 345/211; 327/333

(58) Field of Classification Search .......... 345/211–213; 327/306, 333, 536; 363/59, 60
See application file for complete search history.

(56) References Cited

U.S. PATENT DOCUMENTS

| | | | | |
|---|---|---|---|---|
| 4,259,715 | A * | 3/1981 | Morokawa | 363/60 |
| 2002/0001207 | A1* | 1/2002 | Kishimoto et al. | 363/59 |
| 2006/0164366 | A1* | 7/2006 | Yu et al. | 345/98 |

FOREIGN PATENT DOCUMENTS

| | | | |
|---|---|---|---|
| JP | 11-338572 | A | 12/1999 |
| JP | 2000-050620 | A | 2/2000 |
| JP | 2002-175033 | | 6/2002 |
| JP | 2002-233133 | A | 8/2002 |
| JP | 2004-146082 | A | 5/2004 |
| JP | 2004-229434 | A | 8/2004 |

OTHER PUBLICATIONS

Japanese Office Action for application No. 2006-218130 dated Jul. 15, 2008.

* cited by examiner

*Primary Examiner* — Chanh Nguyen
*Assistant Examiner* — Ram A Mistry
(74) *Attorney, Agent, or Firm* — Rader, Fishman & Grauer PLLC

(57) ABSTRACT

A power circuit includes: a frequency dividing circuit dividing the frequency of a first signal to which a level shift processing has been applied; a boosting circuit boosting the voltage according to an output signal from the frequency dividing circuit or a second signal having a lower frequency than that of the first signal as a boosting pulse; a level shifter; and a switching unit. The switching unit obtains a boosted voltage output from the boosting circuit after a boosting operation, performed by the boosting circuit having received the second signal, inputs the boosted voltage output to the level shifter such that the level shifter can execute level conversion of the first signal, and stops the boosting operation performed according to the second signal, thereafter inputting the level-shifted first signal to the boosting circuit via the frequency dividing circuit to obtain a final boosted voltage.

11 Claims, 14 Drawing Sheets

160A

160

FIG. 9A MCK

FIG. 9D HSYNC

FIG. 9E DDC

FIG. 9F SELMCK

160B

FIG. 12A MCK

FIG. 12D HSYNC

FIG. 12E DDC

FIG. 12F SELMCK

POWER CIRCUIT, DISPLAY DEVICE AND MOBILE TERMINAL IMPLEMENTING A BOOSTING CIRCUIT

CROSS REFERENCES TO RELATED APPLICATIONS

The present invention contains subject matter related to Japanese Patent Application JP 2006-218130 filed in the Japanese paten Office on Aug. 10, 2006, the entire contents of which being incorporated herein by reference.

BACKGROUND OF THE INVENTION

1. Field of the Invention

The present invention relates to a power circuit including a low temperature polysilicon thin film transistor provided on an insulating substrate, an active matrix-type display device such as a liquid crystal display device, and a mobile terminal containing the power circuit and the display device.

2. Description of Related Art

Recently, mobile terminals such as cellular phones and PDAs (personal digital assistants) have become increasingly widespread. One reason for this rapid spread of the mobile terminal is the development of a liquid crystal display device mounted on the mobile terminal as an output display unit. The liquid crystal display device contributes to the wide spread of the mobile terminal because this display device is a low power consumption type display device having characteristics of requiring substantially no driving power in principle.

Currently, the number of such an active matrix type display device has been increasing, which uses polysilicon TFTs (thin film transistors) as switching elements for pixels, and has a digital interface driving circuit on the same substrate as that of a display area containing pixels arranged in a matrix. In this structure, the digital interface driving circuit is provided integrally with the display area.

In this driving circuit integrated type display device, a horizontal driving system and a vertical driving system are disposed on a peripheral area (frame) of an active display unit. These driving systems using the low temperature polysilicon TFTs are formed integrally with the pixel area on the same substrate.

FIG. 1 illustrates a general structure of a typical driving circuit integrated type display device (for example, see JP-A-2002-175033).

As illustrated in FIG. 1, this liquid crystal display device integrates an active display unit 2 where plural pixels including liquid crystal cells are disposed in a matrix, a pair of horizontal driving circuits (H drivers) 3U and 3D positioned above and below the active display unit 2 in FIG. 1, a vertical driving circuit (V driver) 4 disposed on one side of the active display unit 2 in FIG. 1, a reference voltage generating circuit 5 for generating plural reference voltages, a data processing circuit 6, and other parts, all of which components are provided on a transparent insulating substrate such as a glass substrate 1.

As can be seen from the figure, the driving circuit integrated type display device shown in FIG. 1 has the two horizontal driving circuits 3U and 3D disposed on both the sides of the active pixel unit 2 (above and below in FIG. 1) so as to separately drive odd lines and even lines of data lines.

FIG. 2 is a block diagram showing a structure example of the horizontal driving circuits 3U and 3D shown in FIG. 1 for separately driving odd lines and even lines.

As shown in FIG. 2, the horizontal driving circuit 3U for driving odd lines and the horizontal driving circuit 3D for driving even lines have the same structure.

More specifically, each of the horizontal driving circuits 3U and 3D has a shift register (HSR) group 3HSRU or 3HSRD for sequentially outputting a shift pulse (sampling pulse) from each transfer channel in synchronization with a horizontal transfer clock HCK (not shown), a sampling latch circuit group 3SMPLU or 3SMPLD for sequentially sampling and latching digital image data according to a sampling pulse given from shift registers 31U or 31D, a linearly sequential processing latch circuit group 3LTCU or 3LTCD for executing linearly sequential processing for the respective latch data from sampling latch circuits 32U or 32D, and a digital/analog converting circuit (DAC) group 3DACU or 3DACD for converting the digital image data obtained after linearly sequential processing by linearly sequential processing latch circuits 33U or 33D into analog image signals.

Generally, a level shift circuit is disposed on each input channel of DACs 34U and 34D so that level-raised data can be inputted to the DACs 34U and 34D.

SUMMARY OF THE INVENTION

According to the liquid crystal display device shown in FIG. 1 and other figures, the level of voltage supplied from the outside is shifted (boosted) by a power circuit including a DC-DC converter in synchronization with a master clock MCK of a predetermined level supplied from the outside to generate a driving voltage for the components inside the panel. This driving voltage is supplied to desired circuits formed on the insulating substrate.

According to a current low temperature polysilicon TFT, a threshold voltage Vth increases up to about 1.5V at the time of re-boosting.

However, for providing a desired low power consumption type system, synchronizing signal and image data to be inputted to the liquid crystal display device become high-frequency and low-voltage signal and data in many cases.

When the synchronizing signal and image data are high-frequency and low-voltage signal and data, it is difficult to shift level of a high-frequency and low-voltage signal inputted from the outside and divide frequency of that signal inside the panel formed by the low temperature polysilicon TFT process.

It is desirable to provide a power circuit capable of providing and controlling an independent circuit block operating independent of voltage and frequency of interface and a display device and a mobile terminal using the power circuit.

According to an embodiment of the present invention, there is provided a power circuit which includes: a frequency dividing circuit driven by a source voltage to divide the frequency of a first signal to which at least level shift processing has been applied; a boosting circuit driven by a source voltage to boost voltage according to an output signal from the frequency dividing circuit or a second signal having a lower frequency than that of the first signal as a boosting pulse; a level shifter that shifts the level of the first signal by output voltage from the boosting circuit; and a switching unit that complementarily inputs an output signal from the level shifter to the frequency dividing circuit and the second signal to the frequency dividing circuit or the boosting circuit. The first signal has a first amplitude, and the second signal has a second amplitude equal to or larger than the first amplitude and equal or lower than the level of the source voltage which includes the first amplitude. The switching unit obtains a boosted voltage output from the boosting circuit after the boosting operation performed by the boosting circuit having received the second signal, inputs the boosted voltage output to the level shifter such that the level shifter can execute level conversion of the first signal, and stops the boosting operation performed according to the second signal, thereafter inputting the level-shifted first signal to the boosting circuit via the frequency dividing circuit to obtain a final boosted voltage.

According to another embodiment of the present invention, there is provided a display device which includes: a display unit on which pixels are disposed in a matrix; a driving circuit that drives the display unit; and a power circuit that generates internal driving voltage. The power circuit includes: a frequency dividing circuit driven by source a voltage to divide the frequency of a first signal to which at least level shift processing has been applied; a boosting circuit driven by a source voltage to boost the voltage according to an output signal from the frequency dividing circuit or a second signal having lower frequency than that of the first signal as a boosting pulse; a level shifter that shifts the level of the first signal by an output voltage from the boosting circuit; and a switching unit that complementarily inputs an output signal from the level shifter to the frequency dividing circuit and the second signal to the frequency dividing circuit or the boosting circuit. The first signal has a first amplitude, and the second signal has a second amplitude equal to or larger than the first amplitude and equal or lower than the level of the source voltage. The switching unit obtains a boosted voltage output from the boosting circuit after the boosting operation performed by the boosting circuit having received the second signal, inputs the boosted voltage output to the level shifter such that the level shifter can execute level conversion of the first signal, and stops the boosting operation performed according to the second signal, thereafter inputting the level-shifted first signal to the boosting circuit via the frequency dividing circuit to obtain a final boosted voltage.

According to a further embodiment of the present invention, there is provided a mobile terminal which includes a display device. The display device includes: a display unit on which pixels are disposed in a matrix; a driving circuit that drives the display unit; and a power circuit that generates internal driving voltage. The power circuit includes: a frequency dividing circuit driven by source voltage to divide frequency of a first signal to which at least level shift processing has been applied; a boosting circuit driven by a source voltage to boost the voltage according to an output signal from the frequency dividing circuit or a second signal having lower frequency than that of the first signal as a boosting pulse; a level shifter that shifts level of the first signal by output voltage from the boosting circuit; and a switching unit that complementarily inputs an output signal from the level shifter to the frequency dividing circuit and the second signal to the frequency dividing circuit or the boosting circuit. The first signal has a first amplitude, and the second signal has a second amplitude equal to or larger than the first amplitude and equal or lower than the level of the source voltage. The switching unit obtains a boosted voltage output from the boosting circuit after the boosting operation performed by the boosting circuit, having received the second signal, inputs the boosted voltage output to the level shifter such that the level shifter can execute level conversion of the first signal, and stops the boosting operation performed according to the second signal, thereafter inputting the level-shifted first signal to the boosting circuit via the frequency dividing circuit to obtain a final boosted voltage.

According to these embodiments of the invention, the switching unit inputs the second signal to the boosting circuit so as to boost the voltage by the boosting circuit before starting a circuit to which the boosted voltage output from the boosting circuit is inputted, for example.

Then, the switching unit inputs the boosted voltage output according to the second signal to the level shifter so that the level shifter can execute level conversion of the first signal.

After stopping the boosting operation performed according to the second signal, the switching unit inputs the level-shifted first signal to the frequency dividing circuit for frequency division and then to the boosting circuit to obtain stable boosted voltage output.

According to these embodiments of the invention, the circuit block is constituted and controlled independent of the voltage and frequency of the interface. Thus, the circuit integrated type liquid crystal display device appropriate for low-voltage and high-frequency type interface can be provided.

DESCRIPTION OF EXEMPLARY EMBODIMENTS

Embodiments according to the invention are hereinafter described in detail with reference to the drawings.

Figure 1:
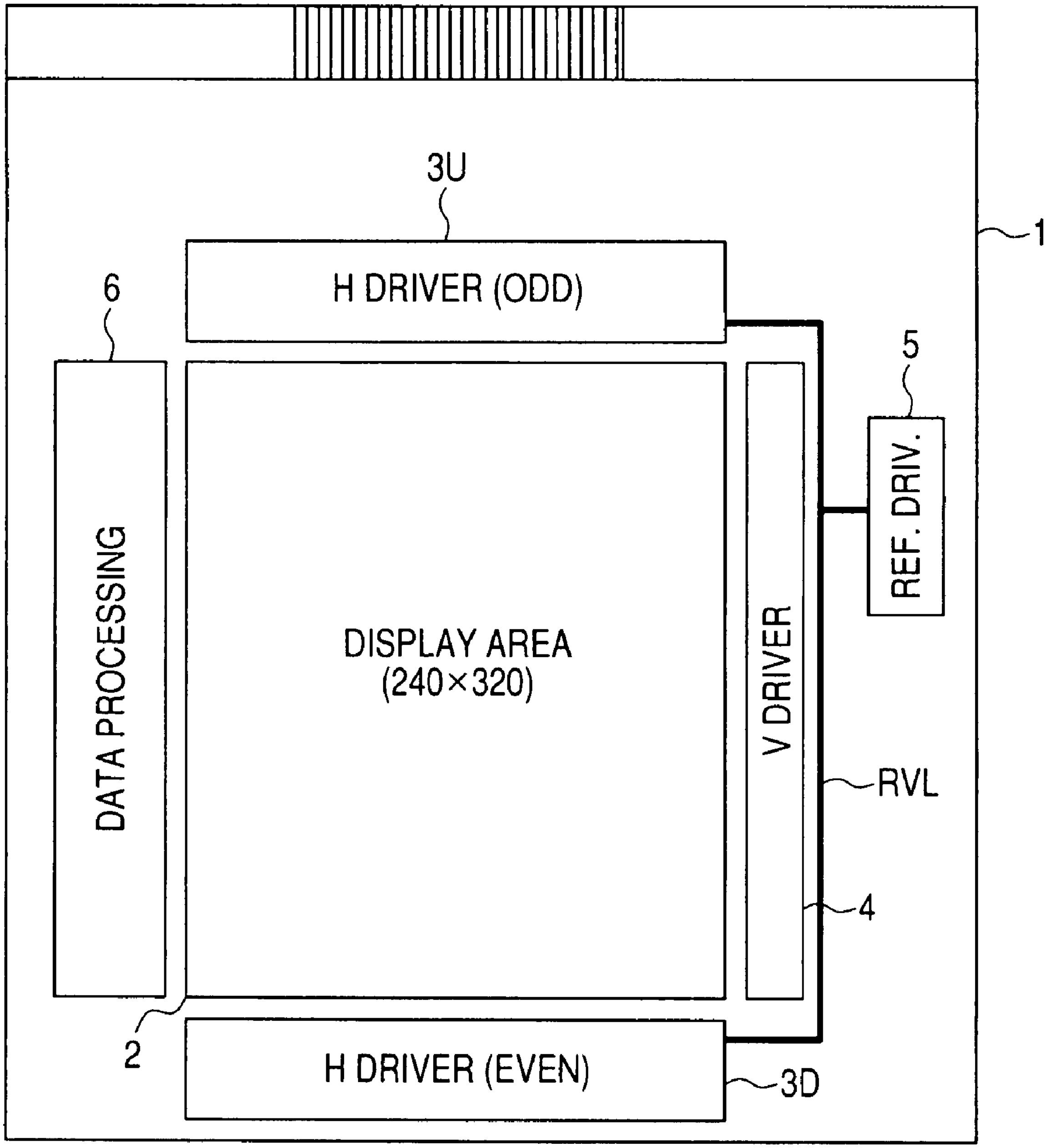
FIG. 1 illustrates a general structure of a typical driving circuit integrated type display device.
Figure 2:
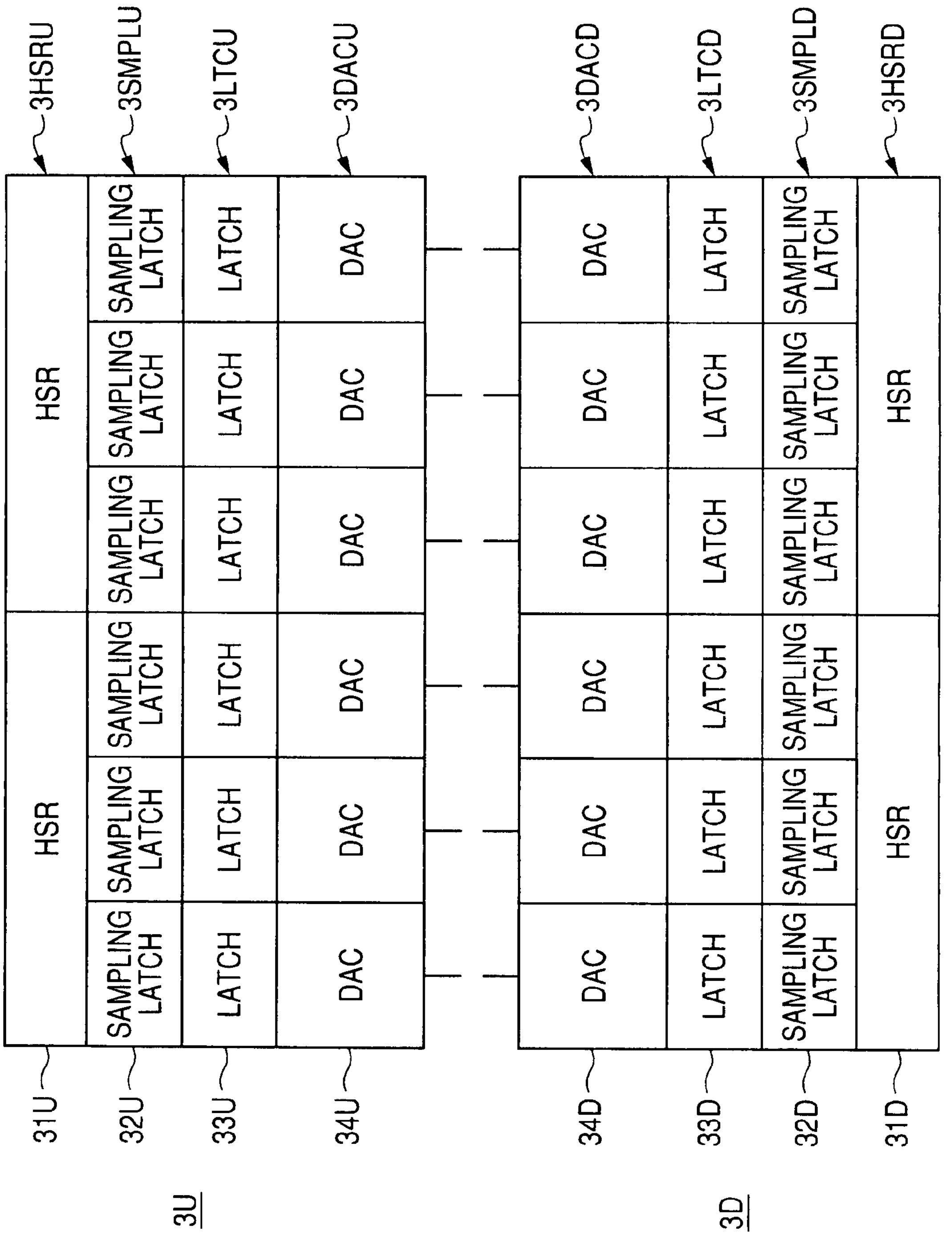
FIG. 2 is a block diagram showing a structure example of horizontal driving circuits in FIG. 1 separately driving odd lines and even lines.
Figure 3:
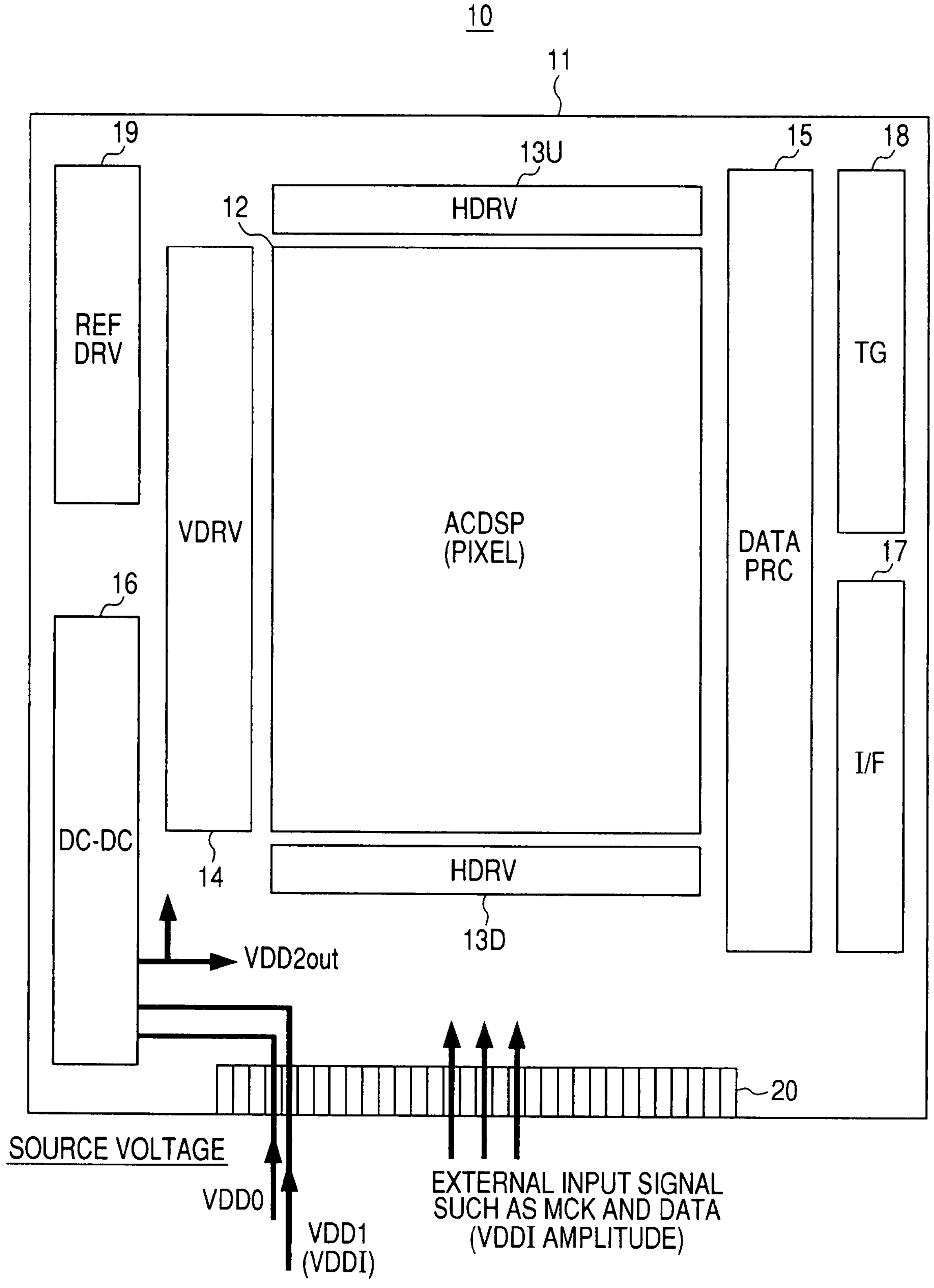
FIG. 3 illustrates a structure arrangement of a driving circuit integrated type display device according to a first embodiment of the invention.
Figure 4:
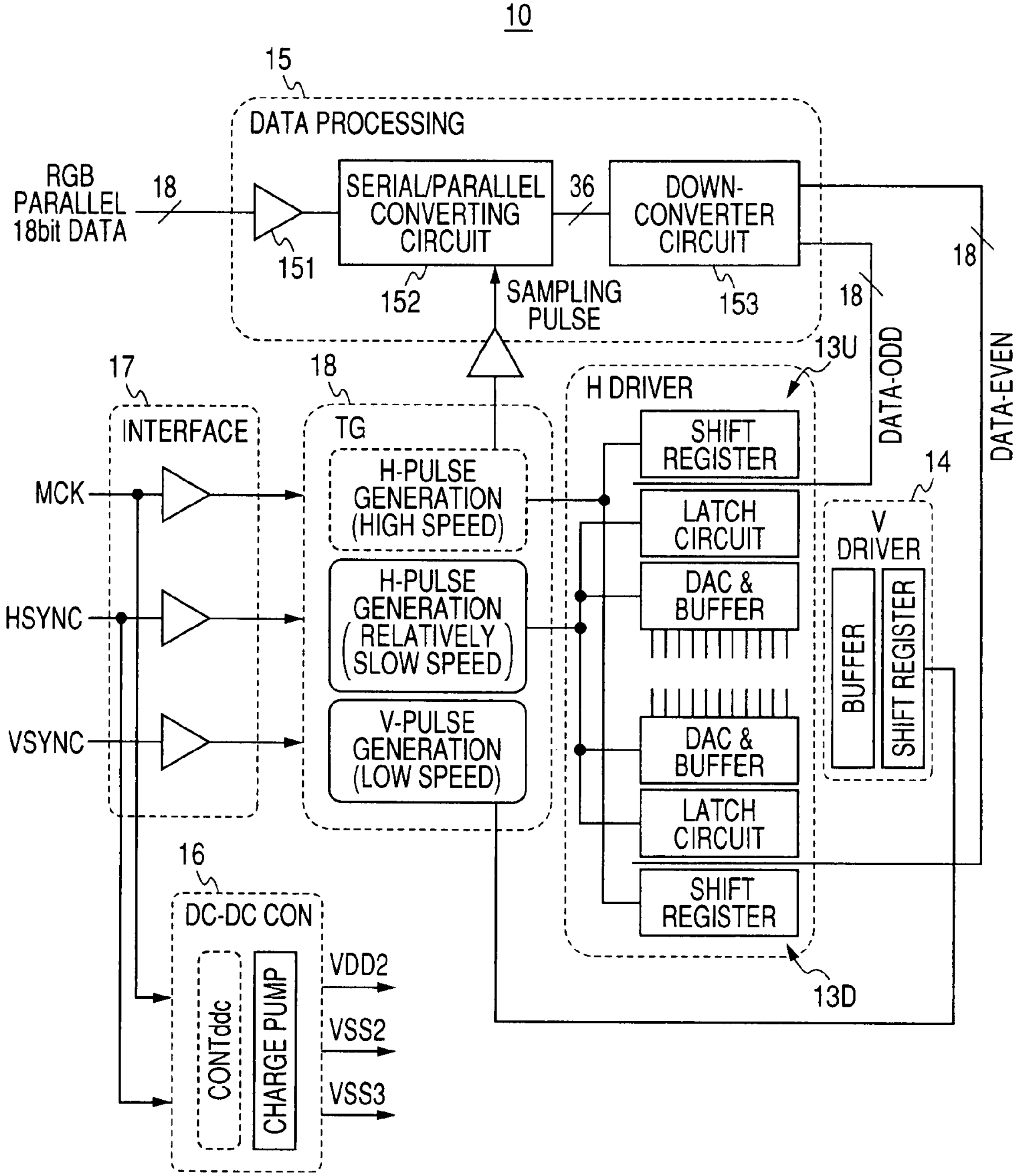
FIG. 4 is a system block diagram showing circuit function of the driving circuit integrated type display device according to the first embodiment of the invention.

FIGS. 3 and 4 illustrate a general structure example of a driving circuit integrated type display device in a first embodiment according to the invention. FIG. 3 shows a structure arrangement of the driving circuit integrated type display device in the first embodiment, and FIG. 4 is a system block diagram showing the circuit function of the driving circuit integrated type display device in the first embodiment.

In this embodiment, the driving circuit integrated type display device is applied to an active matrix type liquid crystal display device using liquid crystal cells as electro-optic elements for respective pixels.

As illustrated in FIG. 3, a liquid crystal display device 10 integrates an active display unit (ACDSP) 12 on which plural pixels containing liquid crystal cells are disposed in a matrix, a pair of first and second horizontal driving circuits (H drivers HDRV) 13U and 13D disposed above and below the active display unit 12 in FIG. 3, a vertical driving circuit (V driver VDRV) 14 disposed on the side of the active display unit 12 in FIG. 3, a data processing circuit (DATAPRC) 15, a power circuit (DC-DC) 16 including a DC-DC converter, an interface circuit (I/F) 17, a timing generator (TG) 18, a reference voltage driving circuit (REFDRV) 19 for supplying plural driving reference voltages to the horizontal driving circuits 13U and 13D, etc., and other parts, and all components are provided on a transparent insulating substrate such as a glass substrate 11.

Furthermore, an input pad 20 for inputting data and the like is provided on the peripheral area of the glass substrate 11 close to the position of the second horizontal driving circuit 13D.

The glass substrate 11 includes a first substrate, on which plural pixel circuits containing active elements (such as transistors) are disposed in a matrix, and a second substrate, opposed to the first substrate, leaving a predetermined clearance from the first substrate. Liquid crystals are sealed into the space between the first and second substrates.

The circuit groups provided on the insulating substrate are produced by low temperature polysilicon TFT process. More specifically, the driving circuit integrated type display device 10 has the horizontal driving systems and the vertical driving system on the peripheral area (frame) of the active display unit. These driving systems using the polysilicon TFTs are provided on the same substrate as that of the pixel area and formed integrally with the pixel area.

The driving circuit integrated type liquid crystal display device 10 in this embodiment has the two horizontal driving circuits 13U and 13D disposed on both the sides of the active pixel unit 12 (above and below in FIG. 3) so as to separately drive odd lines and even lines of data lines.

The two horizontal driving circuits 13U and 13D adopts RGB selector system, which stores three digital data in the corresponding sampling latch circuits, converts the digital data into analog data three times using a common digital/analog converting circuit during one horizontal period (H), and selects the three analog data in the time-sharing manner within the horizontal period to output the selected data to the data lines (signal lines).

In this embodiment, it is assumed that digital R data, digital B data, and digital G data are first digital data, second digital data, and third digital data, respectively, in three digital image data R, G and B.

The structures and functions of the respective components included in the liquid crystal display device 10 in this embodiment are now described one by one.

The active display unit 12 includes plural pixels which contain liquid crystal cells and are arranged in a matrix.

The active display unit 12 further includes data lines and vertical scanning lines arranged in a matrix and driven by the horizontal driving circuits 13U and 13D and the vertical driving circuit 14.

Figure 5:
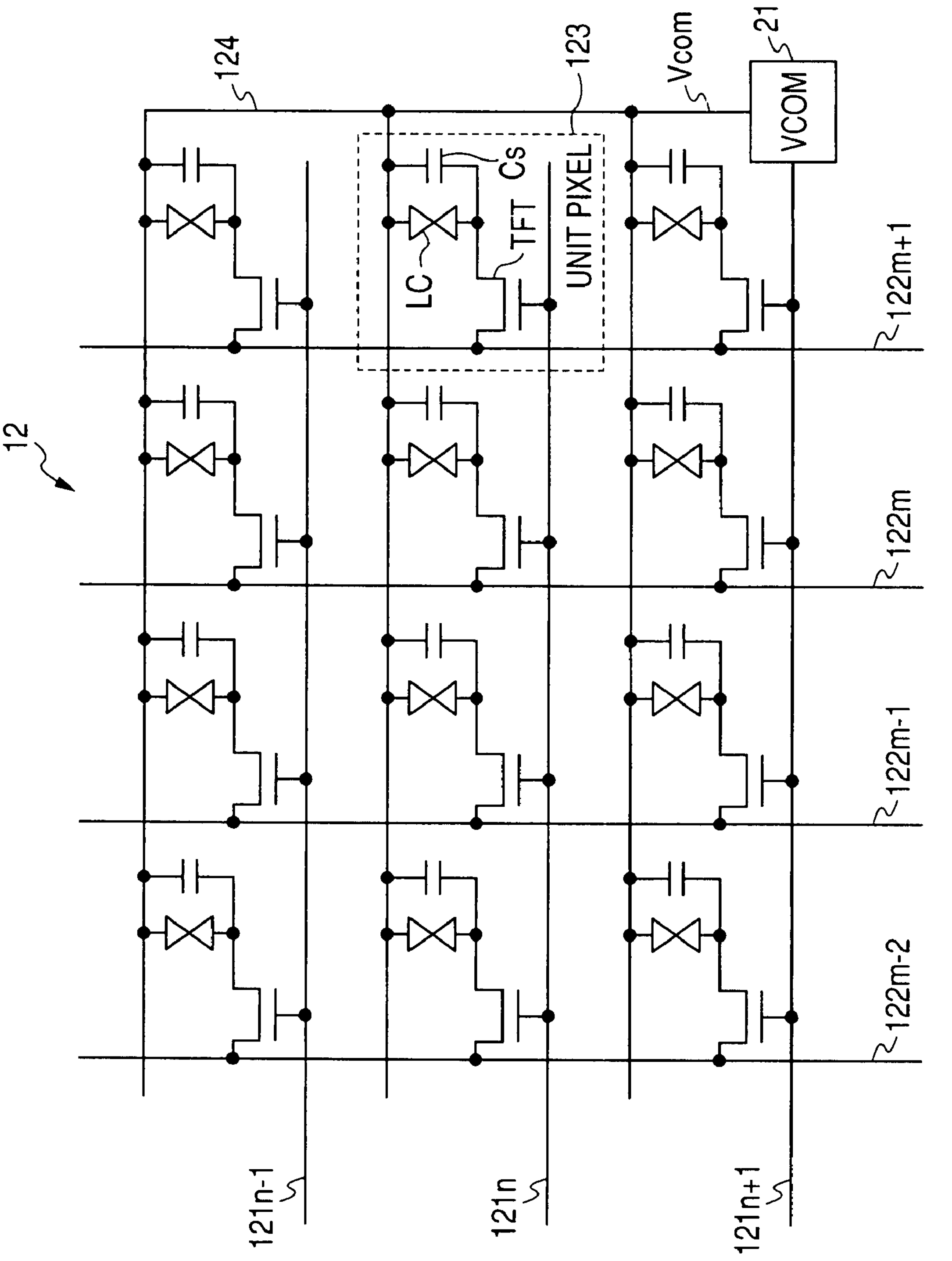
FIG. 5 is a circuit diagram showing a structure example of an active display unit of a liquid crystal display device.

FIG. 5 illustrates an example of a specific structure of the active display unit 12.

In this figure, a pixel arrangement having three lines (n−1 line through n+1 line) and four rows (m−2 row through m+1 row) is shown as an example for simplifying the figure.

In FIG. 5, the display unit 12 has vertical scanning lines 121*n*−1, 121*n*, 121*n*+1 and others, and data lines 122*m*−2, 122*m*−1, 122*m*, 122*m*+1 and others arranged in matrix. Unit pixels 123 are provided on the intersections of these lines.

Each of the unit pixels 123 has a thin film transistor TFT as a pixel transistor, a liquid crystal cell LC, and a holding capacitance Cs. The liquid crystal cell LC herein refers to capacitance generated between a pixel electrode (one electrode) formed by the thin film transistor TFT and an opposed electrode (the other electrode) opposed to the one electrode.

Gate electrodes of the thin film transistors TFT are connected with the vertical scanning lines 121*n*−1, 121*n*, 121*n*+1 and others, and source electrodes of the TFT are connected with the data lines 122*m*−2, 122*m*−1, 122*m*, 122*m*+1 and others.

Pixel electrodes of the liquid crystal cells LC are connected with drain electrodes of the thin film transistors TFT, and opposed electrodes of the liquid crystal cells LC are connected with common lines 124. The holding capacitances Cs are connected between the drain electrodes of the thin film transistors TFT and the common lines 124.

Common voltage Vcom of predetermined alternating voltage is supplied to the common lines 124 by a VCOM circuit 21 formed integrally with the driving circuits and the like on the glass substrate 11.

One end of each of the vertical scanning lines 121*n*−1, 121*n*, 121*n*+1 and others is connected with an output end of the corresponding line of the vertical driving circuit 14 shown in FIG. 3.

The vertical driving circuit 14 includes shift registers, for example, and performs vertical scanning by sequentially generating a vertical selection pulse in synchronization with a vertical transfer clock VCK (not shown) and outputting the vertical selection pulse to the vertical scanning lines 121*n*−1, 121*n*, 121*n*+1 and others.

For example, in the display unit 12, one end of each of the data lines 122*m*−1, 122*m*+1 and others is connected with the output end of the corresponding line of the first horizontal driving circuit 13U shown in FIG. 3, and the other end of each data line is connected with the output end of the corresponding line of the second horizontal driving circuit 13D shown in FIG. 3.

The first horizontal driving circuit 13U stores three types of digital data as the R data, B data, and G data in the corresponding sampling latch circuits. Then, the first horizontal driving circuit 13U converts the stored data into analog data three times during one horizontal period (H), selects the three data in the time-sharing manner during the horizontal period, and outputs the data to the corresponding data lines.

The first horizontal driving circuit 13U transfers the R data and B data latched by the first and second sampling latch circuits to the first latch circuit and further to the second latch circuit in the time-sharing manner according to the RGB selector system. While transferring the R data and B data to the latch circuits in the time-sharing manner, the first horizontal driving circuit 13U transfers the G data latched by the third sampling latch circuit to the third latch circuit. Then, the first horizontal driving circuit 13U selectively outputs the R, B and G data latched by the second and third latch circuits within one horizontal period and converts the selected data into analog data, thereafter the circuit 13U selects the three analog data in the time-sharing manner within the horizontal period and outputs the selected data to the corresponding data lines.

As obvious, the horizontal driving circuit 13U according to this embodiment has a first latch sequence for two types of digital R and B data and a second latch sequence for one type of digital G data disposed in parallel, and uses post-selector common components containing the digital/analog converting circuit (DAC), analog buffer, and line selector for achieving the RGB selector system. This structure contributes to narrowing of frame and reduction of power consumption.

The second horizontal driving circuit 13D basically has the same structure as that of the first horizontal driving circuit 13U.

Figure 6:
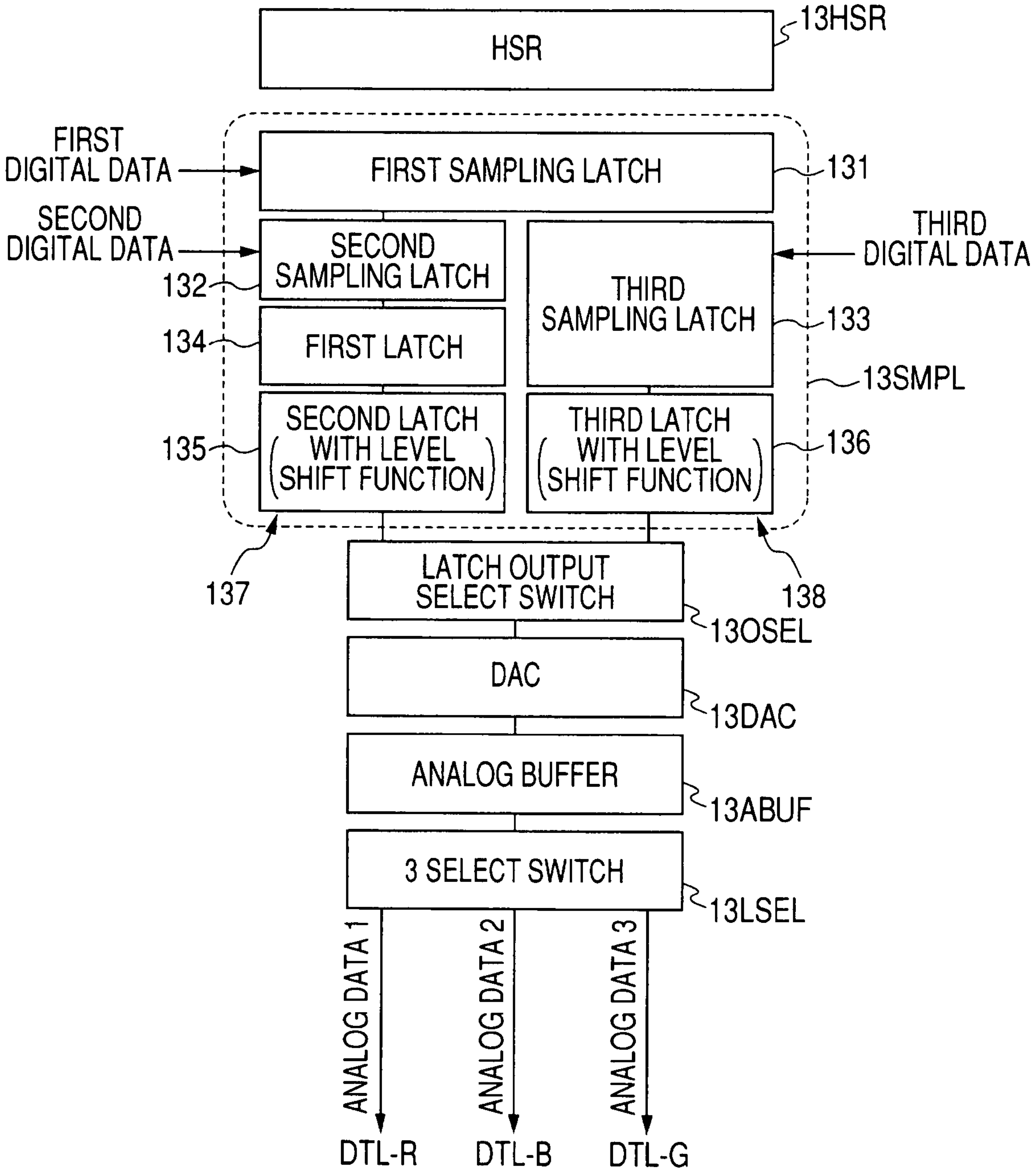
FIG. 6 is a block diagram showing a basic structure example of first and second horizontal driving circuits according to the first embodiment.

FIG. 6 is a block diagram showing an example of the basic structures of the first horizontal driving circuit 13U and the second horizontal driving circuit 13D according to this embodiment. The horizontal driving circuits 13U and 13D are collectively referred to as a horizontal driving circuit 13 in the following description.

The horizontal driving circuit shown in FIG. 6 has a basic structure corresponding to the three types of digital data, and similar plural structures are disposed in parallel for practical use.

As illustrated in FIG. 6, the horizontal driving circuit 13 has a shift register (HSR) group 13HSR, a sampling latch circuit group 13SMPL, a latch output select switch 13OSEL, a digital/analog converting circuit 13DAC, an analog buffer 13ABUF, and a line selector 13LSEL.

The shift register group 13HSRU has a plurality of shift registers (HSR) for sequentially outputting a shift pulse (sampling pulse) to the sampling latch circuit group 13SMPL from the transfer channels corresponding to the respective rows in synchronization with the horizontal transfer clock HCK (not shown).

The sampling latch circuit group 13SMPL has a first sampling latch circuit 131 for sequentially sampling and latching the R data as the first digital data, a second sampling latch circuit 132 for sequentially sampling and latching the B data as the second digital data and for latching the R data latched by the first sampling latch circuit 131 according to predetermined timing, a third sampling latch circuit 133 for sequentially sampling and latching the G data as the third digital data, a first latch circuit 134 for serially transferring the digital R data or B data latched by the second sampling latch circuit 132, a second latch circuit 135 having a level shift function for converting the digital R data or B data latched by the first latch circuit 134 into data having higher voltage amplitude and for latching the resultant data, and a third latch circuit 136 having a level shift function for converting the digital G data latched by the third sampling latch circuit 133 into data having higher voltage amplitude and for latching the resultant data.

According to the sampling latch circuit group 13SMPL having this structure, a first latch sequence 137 containing the first sampling latch circuit 131, second sampling latch circuit 132, first latch circuit 134, and second latch circuit 135, and a second latch sequence 138 containing the third sampling latch circuit 133 and the third latch circuit 136 are provided.

According to this embodiment, data inputted from the data processing circuit 15 to the respective horizontal driving circuits 13U and 13D are supplied at the level of 0-3V (2.9V) level.

The data at this level is raised to the level in the range from −2.3V to 4.8V, for example, by the level shift functions of the second and fourth latch circuits 135 and 136 at the output channels of the sampling latch circuit group 13SMPL.

The latch output select switch 13OSEL selectively switches the output from the sampling latch circuit group 13SMPL and supplies the output to the digital/analog circuit 13DAC.

The digital/analog converting circuit 13DAC executes digital/analog conversion three times during, one horizontal period. More specifically, the digital/analog converting circuit 13DAC converts the three digital data R, G and B into respective analog data during one horizontal period.

The analog buffer 13ABUF buffers the R, B and G data converted into analog signals by the digital/analog converting circuit 13DAC and outputs the resultant data to the line selector 13LSEL.

The line selector 13LSEL selects the three analog data R, B and G during one horizontal period, and outputs the data to corresponding data lines DTL-R, DTL-B and DTL-G.

The operation of the horizontal driving circuit 13 is now discussed.

The horizontal driving circuit 13 stores serial image data in the first, second, and third sampling latch circuits 131, 132, and 133 when sampling the image data.

When all data on one horizontal line is stored in the first, second, and third sampling latch circuits 131 through 133, data contained in the second sampling latch circuit 132 is transferred to the first latch circuit 134 during a horizontal blanking period. Immediately after transferred to the first latch circuit 134, the data is further transferred to the second latch circuit 135 and stored therein.

Then, data contained in the first sampling latch circuit 131 is transferred to the second sampling latch circuit 132. Immediately after transferred to the second sampling latch circuit 132, the data is further transferred to the first latch circuit 134 and stored therein. During the same period, data contained in the third sampling latch circuit 133 is transferred to the third latch circuit 136.

Subsequently, data on the next horizontal line is stored in the first, second, and third sampling latch circuit 131, 132, and 133.

While the data on the next horizontal line is being stored, the data stored in the second latch circuit 135 and third latch circuit 136 is outputted to the digital/analog converting circuit 13DAC by switching the latch output select switch 13OSEL.

Then, the data stored in the first latch circuit 134 is transferred to the second latch circuit 135 and stored therein. The stored data is outputted to the digital/analog converting circuit 13DAC by switching the latch output select switch 13OSEL.

This sampling latch system outputs the three digital data to the digital/analog converting circuit 13DAC, thereby contributing to the increase in accuracy and narrowing of the frame.

The G data, which is the most effective color data to the human eye, is selected as the third digital data for the reason that the third data is not transferred while data on one horizontal line is being stored and that data are preferably written in the order of B (blue), G (green) and R (red) considering the VT characteristics of liquid crystals in case of RGB selector drive. Thus, the non-uniformity of image quality can be reduced.

As illustrated in FIG. 4, the data processing circuit 15 has a level shifter 151 for shifting the level of the parallel digital R, G and B data inputted from the outside from 0-3V (2.9V) level to 6V level, a serial/parallel converting circuit 152 for converting serial data to parallel data to adjust phases and lower frequencies of the level-shifted R, G and B data, and a down-converter 153 for lowering the level of the parallel data from the 6V level to the 0-3V (2.9V) level and outputting odd data to the horizontal driving circuit 13U and even data to the horizontal driving circuit 13D.

The power circuit 16 includes a DC-DC converter adopting boosting pulse switching system, and receives a liquid crystal voltage (interface voltage) VDD1 (such as 2.9V) from the outside, for example. The power circuit 16 boosts the received voltage to doubled internal panel voltage VDD2 of 6V level (such as 5.8V) in synchronization with a master clock MCK and a horizontal synchronizing signal HSYNC supplied from the interface circuit 17, by using a contained oscillating circuit or the like, or based on a corrected clock produced by correcting a clock having low (slow) frequency and variant oscillation frequency according to a predetermined correction system and the horizontal synchronizing signal HSYNC, and supplies the resultant voltage to the respective circuits inside the panel.

The power circuit 16 further generates VSS2 (such as −1.9V) and VSS3 (such as −3.8V) as negative voltages as internal panel voltages and supplies the voltages to predetermined circuits (such as interface circuit) inside the panel.

The interface circuit 17 shifts the levels of the master clock MCK, horizontal synchronizing signal HSYNC, and vertical synchronizing signal VSYNC supplied from the outside to a panel internal logic level (such as VDD2 level). Then, the interface circuit 17 supplies the level-shifted master clock MCK, horizontal synchronizing signal HSYNC, and vertical synchronizing signal VSYNC to the timing generator 18, and supplies the horizontal synchronizing signal HSYNC to the power circuit 16.

The interface circuit 17 need not supply the master clock MCK to the power circuit 16 when the power circuit 16 boosts voltage based on a correction clock produced by correcting a clock from a contained oscillating circuit without using the master clock. Alternatively, the power circuit 16 can be designed not to use the master clock MCK for, boosting, leaving the master clock MCK supply line to the power circuit 16 from the interface circuit 17 as it is.

The timing generator 18 generates a horizontal start pulse HST and a horizontal clock pulse HCK (HCKX) used as clocks for the horizontal driving circuits 13U and 13D, and a vertical start pulse VST and a vertical clock VCK (VCKX) used as clocks for the vertical driving circuit 14 in synchronization with the master clock MCK, horizontal synchronizing signal HSYNC, and vertical synchronizing signal VSYNC supplied from the interface circuit 17. Then, the timing generator 18 supplies the horizontal start pulse HST and horizontal clock pulse HCK (HCKX) to the horizontal driving circuits 13U and 13D, and supplies the vertical start pulse VST and vertical clock VCK (VCKX) to the vertical driving circuit 14.

The structure of the DC-DC converter of the power circuit 16, which boosts the liquid crystal voltage van given from the outside to the doubled internal panel voltage VDD2 of 6V level (such as 5.8V) and supplies the resultant voltage to the respective circuits inside the panel, is now discussed as a featured structure of this embodiment.

Figure 7:
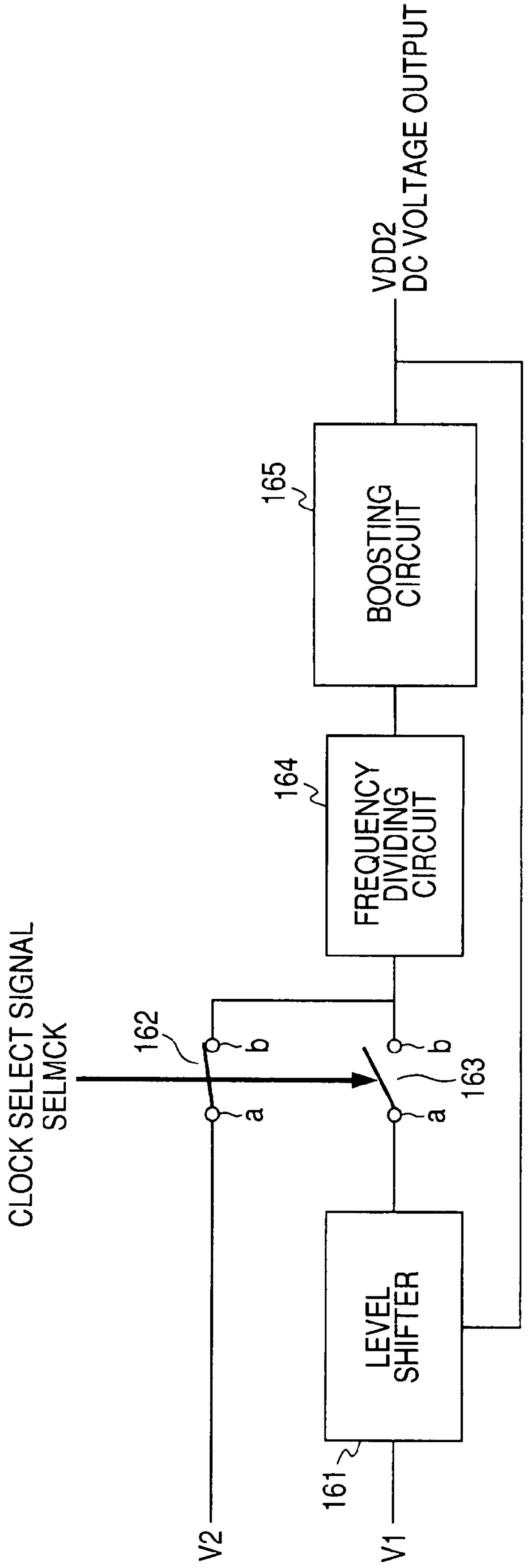
FIG. 7 is a block diagram showing a basic structure of a DC-DC converter using a boosting pulse switching system according to the first embodiment.

FIG. 7 is a block diagram showing a basic structure of the DC-DC converter using the boosting pulse switching system according to the first embodiment.

Two boosting pulse generating input signals V1 and V2 having different frequencies are supplied to a DC-DC converter 160 shown in FIG. 7. The DC-DC converter 160 chiefly includes a level shifter 161, switches 162 and 163, a frequency dividing circuit 164, and a boosting circuit 165. The switches 162 and 163 provide switching units.

In the DC-DC converter 160, the frequency dividing circuit 164 and the boosting circuit 165 are driven by the source voltage VDD. The two input signals are a signal V1 having an amplitude AMP1 corresponding to VDDI (interface voltage), and a signal V2 having an amplitude AMP2 in the range of VDDI≦AMP2≦VDD.

The signal V1 is a high-frequency pulse incapable of converting the level from VDDI to VDD, and the signal V2 is a low-frequency pulse capable of converting the level from VDDI to VDD.

The signal V1 is inputted to the level shifter 161, and the signal V2 is inputted to the switch 162.

A fixed contact a of the switch 162 is connected with the input line of the signal V2, and an operation contact b of the switch 162 is connected with the input of the frequency dividing circuit 164.

A fixed contact a of the switch 163 is connected with the output of the level shifter 161, and an operation contact b of the switch 163 is connected with the input of the frequency dividing circuit 164.

The switches 162 and 163 are complementarily turned on and off by a clock select signal SELMCK. When the clock select signal SELMCK is at low level, for example, the switch 162 is turned on and the switch 163 is turned off. When the clock select signal SELMCK is at high level, the switch 162 is turned off and the switch 163 is turned on.

The output of the frequency dividing circuit 164 is connected with the boosting circuit 165. The DC voltage VDD2 boosted by the boosting circuit 165 is outputted therefrom, and this voltage VDD2 is also supplied to the level shifter 161.

In the DC-DC converter 160 having this structure, the switch 162 is turned on and the switch 163 is turned off according to the clock select signal SELMCK before the circuit groups connected with the DC-DC converter 160 are started. By this step, the signal V2 is supplied as a boosting pulse to the boosting circuit 165 via the frequency dividing circuit 164 so as to boost voltage and obtains the stable boosted voltage output VDD2.

However, the boosting frequency based on the signal V2 is low, and the current supply capacity of the DC-DC converter 160 is insufficient when the circuit groups are started in this condition. As a result, it is difficult to maintain the desired voltage output.

It is possible, however, to convert the level of the signal V1 from VDDI to VDD by using the stable output VDD2 of the DC-DC converter 160 started by a light load (or no load). In this case, the switch 162 is turned off and the switch 163 is turned on by the clock select signal SELMCK, and the signal V1 is inputted to the frequency dividing circuit 164. By this method, a high-frequency boosting pulse capable of driving the frequency dividing circuit 164 can be obtained.

Accordingly, the desired current supply capacity and voltage output can be provided by switching the boosting pulse to V2 by the clock select signal SELMCK for boosting voltage, and starting the circuit groups after the output is stabilized.

The basic concept of the DC-DC converter of the power circuit according to this embodiment has been explained. A specific structure example of the DC-DC converter of the power circuit according to this embodiment is now discussed.

Figure 8:
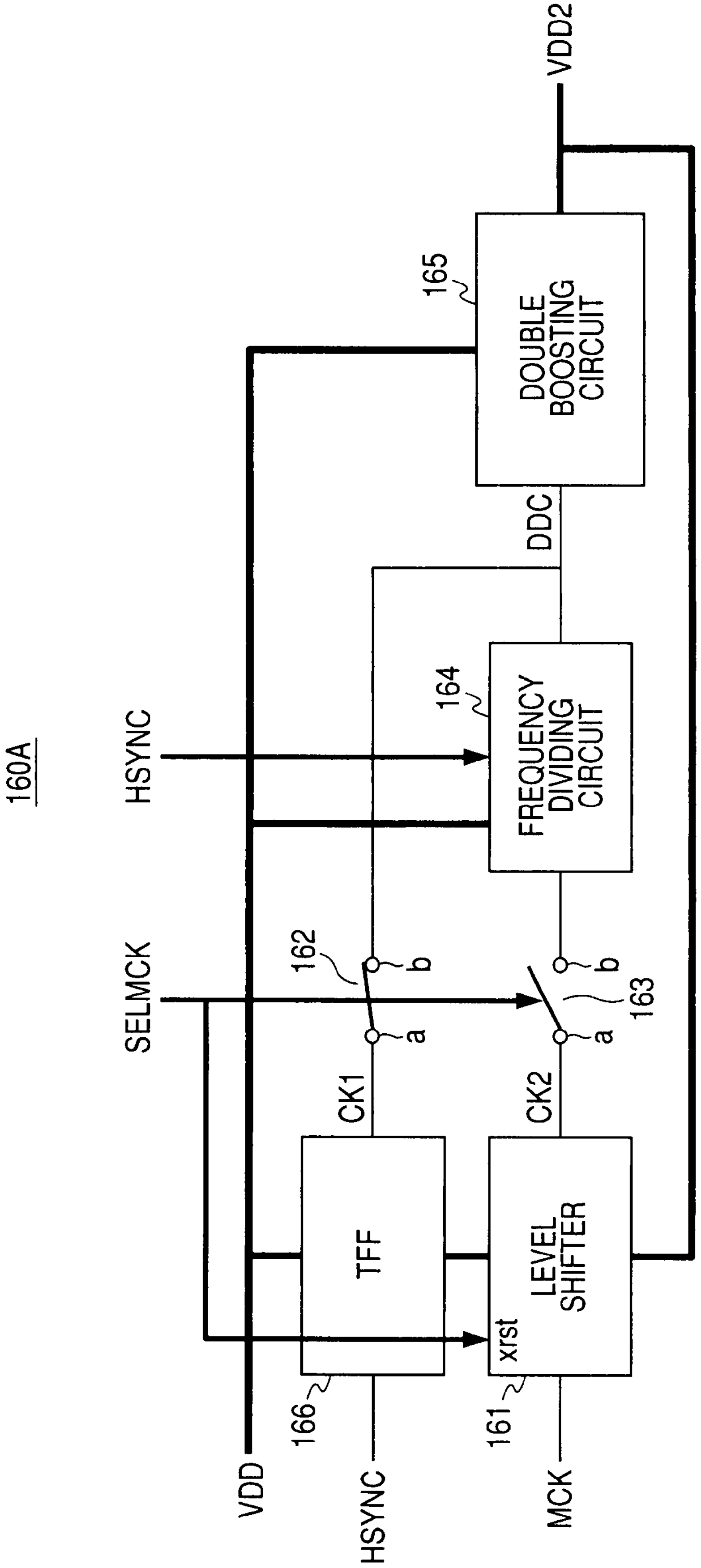
FIG. 8 is a block diagram showing a specific structure example of a DC-DC converter using a boosting pulse switching system according to the first embodiment.

FIG. 8 is a block diagram showing a specific structure example of a DC-DC converter using the boosting pulse switching system in the first embodiment.

Figure 9:
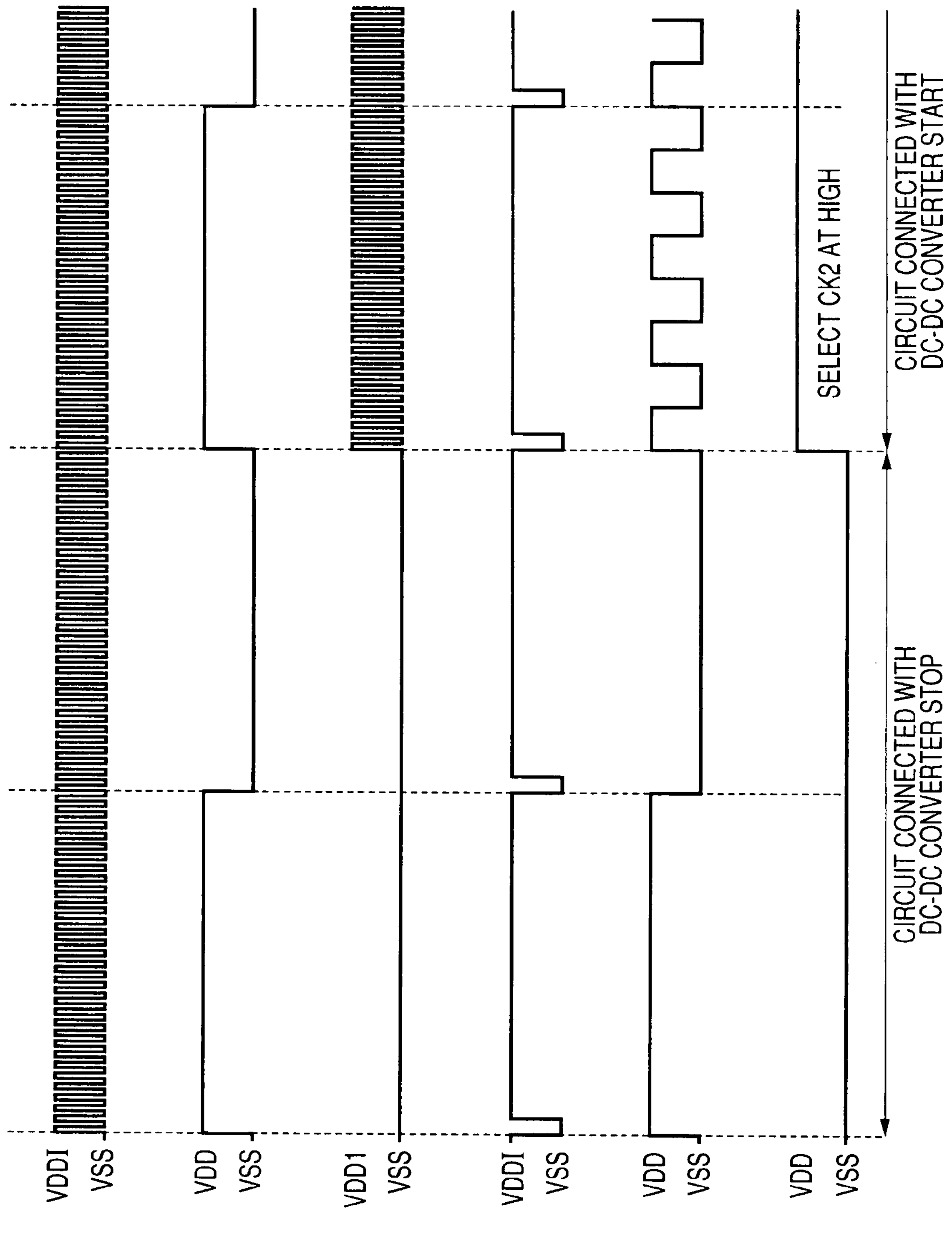
FIG. 9 is a timing chart of the DC-DC converter shown in FIG. 8.

Charts (A) through (F) in FIG. 9 are timing charts of the DC-DC converter shown in FIG. 8.

A DC-DC converter 160A shown in FIG. 8 is provided on the polysilicon TFT glass substrate, and receives MCK and HSYNC having the amplitude VDDI as external input signals. The signal MCK represents a master clock of the liquid crystal driving device, and the signal HSYNC represents the horizontal synchronizing signal.

The master clock MCK is a high-frequency pulse incapable of converting the level from the VDDI to VDD on the substrate, and corresponds to the signal V1 in FIG. 7. The horizontal synchronizing signal HSYNC is a low-frequency pulse capable of converting the level from VDDI to VDD on the substrate, and corresponds to the signal V2 in FIG. 7.

The DC-DC converter 160A in FIG. 8 has a toggle-type flip-flop (TFF) 166 for dividing the frequency of the horizontal synchronizing signal HSYNC as the signal V2 into two halves, and a clock CK1 produced after frequency division into two halves by the TFF 166 is inputted to the boosting, circuit 165 via the switch 162. Also, a clock CK2 produced by shifting the level of the master clock MCK by the level shifter 161 is inputted to the frequency dividing circuit 164 via the switch 163.

The horizontal synchronizing signal HSYNC is also supplied to the frequency dividing circuit 164, and the clock select signal SELMCK is further supplied to the level shifter 161.

In the DC-DC converter 160A in FIG. 8, the clock CK1 is a signal obtained after the frequency division of the horizontal synchronizing signal HSYNC into two halves by the TFF 166 and level conversion to VDD, and thus has an appropriate frequency for driving the boosting circuit 165. Thus, the clock CK1 does not need further frequency division, and is supplied to the boosting circuit 165 as it is.

When the clock select signal SELMCK is at low level, the switch 162 is tuned on and the switch 163 is turned off. In this case, the level shifter 161 is reset.

When the clock select signal SELMCK is at high level, the switch 162 is tuned off and the switch 163 is turned on. In this case, the level shifter 161 is operated.

The operation of the DC-DC converter 160A having this structure is now discussed.

External supply voltages VDD0 and VDD1 are inputted to the power circuit 16.

According to the DC-DC converter 160A of the power circuit 16, the clock CK1 is supplied to the boosting circuit 165 at the time of stop of the circuit groups connected to the DC-DC converter and the low-level clock select signal SELMCK. The boosting circuit 165 boosts voltage according to the clock CK1 as a boosting pulse and obtains the stable voltage output VDD2.

The level of the clock CK2 is converted from VDDI to VDD by using the stable output VDD2 from the DC-DC converter 160A to obtain a high-frequency boosting pulse sufficient for driving the frequency dividing circuit 164.

After this step, the clock select signal SELMCK is set at high level, and supplied to the boosting circuit 165 via the switch 163 and frequency dividing circuit 164. The boosting circuit 165 boosts voltage according to the clock CK2 as a boosting pulse, and starts the connected circuit groups to obtain desired current supply capacity and the voltage output VDD2.

Then, the data processing circuit 15 provided on the glass substrate 11 performs parallel conversion for the parallel digital data inputted from the outside to adjust the phase and lower the frequency. The R data, B data, and G data thus obtained are inputted to the first and second horizontal driving circuits 13U and 13D.

In the first and second horizontal driving circuits 13U and 13D, the digital G data inputted from the data processing circuit 15 is sequentially sampled for the period of 1H and held by the third sampling latch circuit 133. Thereafter, the G data is transferred to the third latch circuit 136 during the horizontal blanking period.

Simultaneously, the R data and the B data are separately sampled for the period of 1H and held by the first and second sampling latch circuits 131 and 132. Then, the R and G data are transferred to the first latch circuit 134 during the next horizontal blanking period.

When all the data on the one horizontal line are stored in the first, second and third sampling latch circuits 131 through 133, the data in the second sampling latch circuit 132 is transferred to the first latch circuit 134 during the horizontal blanking period. After transferred to the first latch circuit 134, the data is immediately transferred to the second latch circuit 135 and stored therein.

Then, the data in the first sampling latch circuit 131 is transferred to the second sampling latch circuit 132. After transferred to the second sampling latch circuit 132, the data is immediately transferred to the first latch circuit 134 and stored therein. Also, the data in the third sampling latch circuit 133 is transferred to the third latch circuit 136 during the same period.

Subsequently, data on the next horizontal line is stored in the first, second and third sampling latch circuits 131, 132 and 133.

While data on the next horizontal line is being stored, the data stored in the second latch circuit 135 and third latch circuit 136 is outputted to the digital/analog converting circuit 13DAC by switching the latch output select switch 13OSEL.

Then, the data stored in the first latch circuit 134 is transferred to the second latch circuit 135 and stored therein. Thereafter, the stored data is outputted to the digital/analog converting circuit 13DAC by switching the latch output select switch 13OSEL.

The R, B and G data converted into analog data by the digital analog/converting circuit 13DAC are held by the analog buffer 13ABUF during the next 1H period, and the respective analog R, B and G data are outputted to the corresponding data lines by dividing the period of 1H into three partial periods.

The processing order of the G, R and B data may be changed when practicing this embodiment.

In the DC-DC converter included in the power circuit 16 according to this embodiment described above, the switch 162 is turned on and the switch 163 is turned off, according to the clock select signal SELMCK, before the circuit groups connected with the DC-DC converter are started. Then, the signal V2, as the boosting pulse, is supplied to the boosting circuit 165 via the frequency dividing circuit 164 to boost the voltage and obtains the stable boosted voltage output VDD2. However, the boosting frequency based on the signal V2 is low, and the current supply capacity of the DC-DC converter 160 is insufficient when the circuit groups are started in this condition. As a result, desired voltage output cannot be maintained.

It is possible, however, to convert the level of the signal V1 from VDDI to VDD by using the stable output VDD2 of the DC-DC converter 160 started by a light load (or no load) in this embodiment. In this case, the switch 162 is turned off and the switch 163 is turned on by the clock select signal SELMCK, and the signal V1 is inputted to the frequency dividing circuit 164. By this method, a high-frequency boosting pulse capable of driving the frequency dividing circuit 164 can be obtained.

According to this embodiment, therefore, the desired current supply capacity and voltage output are provided by switching the boosting pulse to V2 by the clock select signal SELMCK for boosting voltage, and starting the circuit groups after the output is stabilized.

Accordingly, the DC-DC converter can be started independent of the voltage and frequency of the interface, and thus a low-voltage and high-frequency type interface and a circuit integrated type liquid crystal display device using this interface can be provided.

In addition, the low-voltage and high-frequency type interface has a simplified structure.

According to this embodiment, the display device includes: the first latch sequence 137 vertically connecting the sampling latch circuits 131 and 132 for the first digital data (R) and the second digital data (B), the first latch circuit 134, and the second latch circuit 135 for serial transfer; the second latch sequence 138 vertically connecting the sampling latch circuit 133 for the third digital data and the third latch circuit 136; and the common digital/analog (DA) converting circuit 13DAC, analog buffer circuit 13ABUF, and line selector 13LSEL for selectively outputting the three types of analog data (R, B and G) to the corresponding data lines during the horizontal period (H). This structure can provide the following advantages.

According to this structure, the necessary number of the DA converting circuits and analog buffer circuits is smaller than that of a known system for the same dot pitch width. Thus, the frame can be narrowed.

In addition, since the data processing circuit has the sampling latch circuits for the first and second digital data and the sampling latch circuit for the third digital data, the degree of accuracy increases.

Thus, the system according to this embodiment can provide the three-line selector system capable of achieving high accuracy and frame narrowing on the insulating substrate, and the driving circuit integrated type display device using this system.

Moreover, since the number of the circuits included in the horizontal driving circuits is reduced, the system according to this embodiment can provide the low power consumption type, three-line selector system and the a driving circuit integrated type display device using this system.

Furthermore, since data is divided into three parts and outputted to the signal lines during one horizontal period, the system according to this embodiment can provide the three-line selector system which operates at high speed and provides image quality having reduced non-uniformity, and the driving circuit integrated type display device using this system.

Next, a second embodiment is described.

Figure 10:
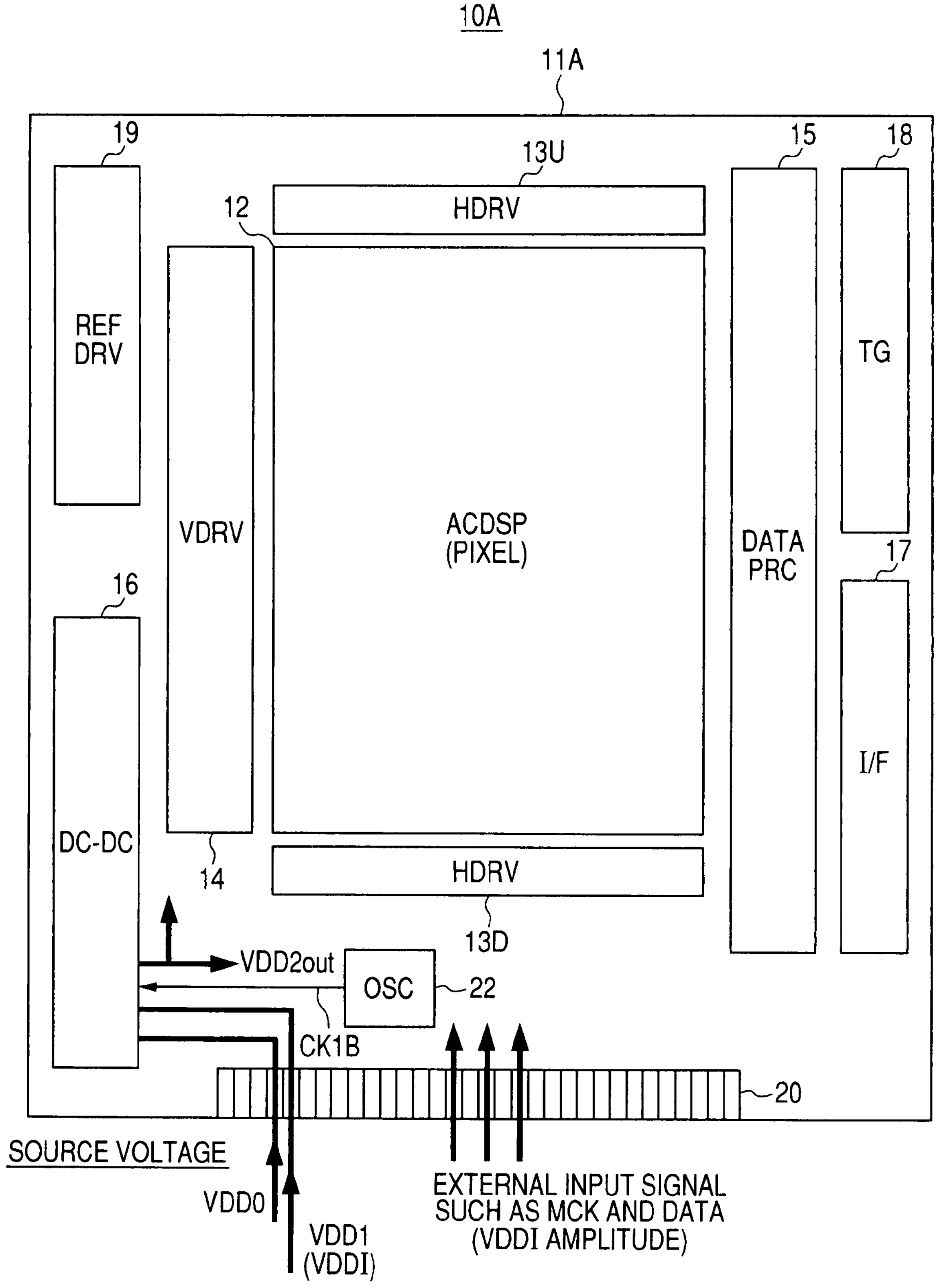
FIG. 10 illustrates a structure arrangement of a driving circuit integrated type display device according to a second embodiment.

FIG. 10 illustrates structure arrangement of a driving circuit integrated type display device according to the second embodiment.

A display device 10A in the second embodiment is different from the display device 10 in the first embodiment in that the display device 10A has adopted a boosting pulse switching system utilizing a frequency division correction system which contains an oscillator 22 inside the panel and corrects oscillation frequency variations of an oscillating unit (OSC) 21 in a power circuit 16A.

Figure 11:
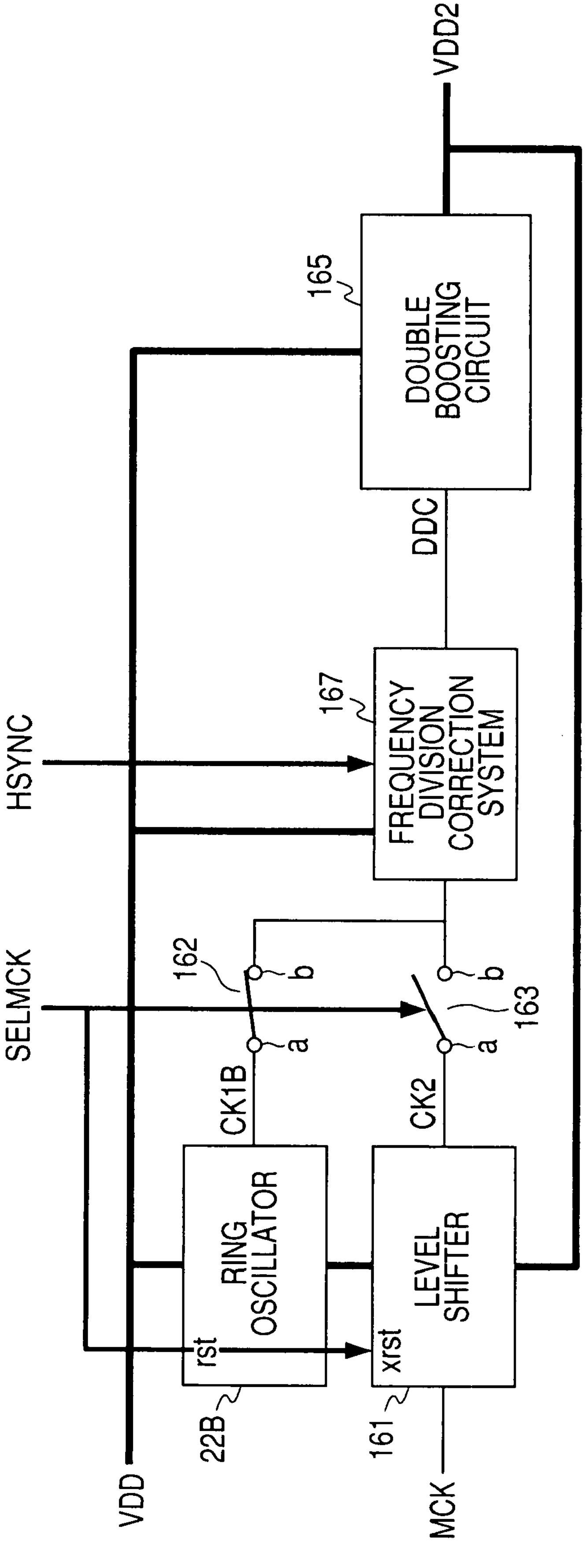
FIG. 11 illustrates a structure example of a DC-DC converter according to the second embodiment.

FIG. 11 illustrates a structure example of a DC-DC converter in the second embodiment.

Figure 12:
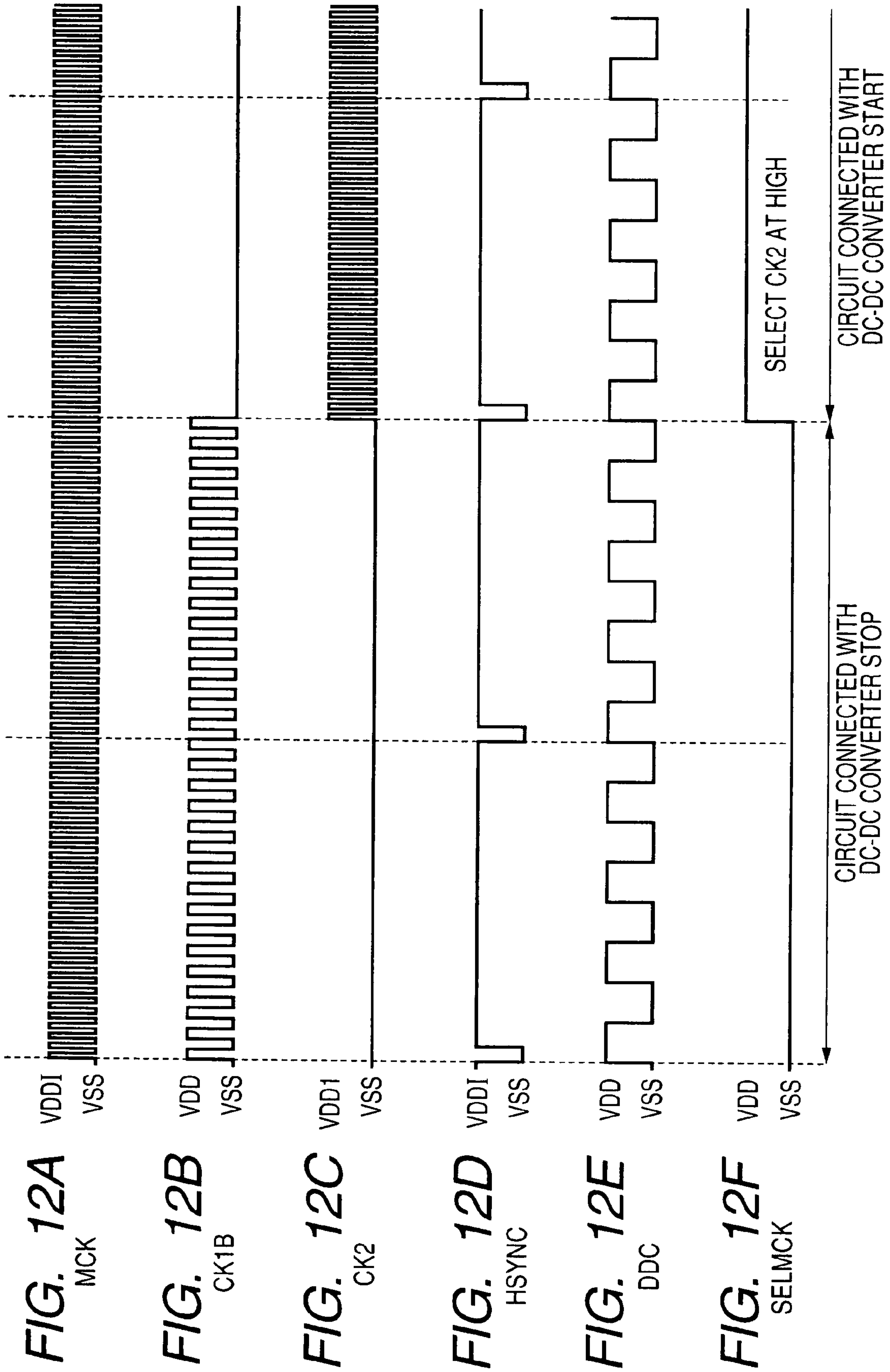
FIG. 12 is a timing chart of the DC-DC converter shown in FIG. 11.

Charts (A) through (F) in FIG. 12 are timing charts of the DC-DC converter shown in FIG. 11.

A DC-DC converter 160B in FIG. 11 is different from the DC-DC converter 160A in FIG. 8 in that the DC-DC converter 160B uses an oscillator (ring oscillator) 22B instead of the TFF and a frequency division correction system 167 instead of the frequency dividing circuit such that a clock CK1B from the ring oscillator 22B can be inputted to the frequency division correction system 167 via the switch 162.

The DC-DC converter 160B similarly receives the master clock MCK having the amplitude VDDI and the horizontal synchronizing signal HSYNC as the outside input signal.

The oscillating unit 21 uses the ring oscillator 22B.

Figure 13:
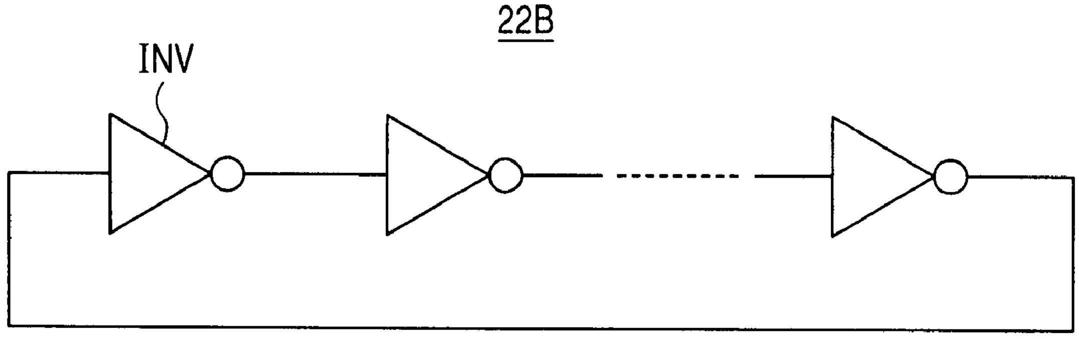
FIG. 13 illustrates a structure example of a ring oscillator.

The ring oscillator 22B is formed by connecting an odd number of inverters INV in the form of a ring as illustrated in FIG. 13.

An oscillator including a transistor produced by a low temperature polysilicon process exhibits variant transistor characteristics depending on various conditions such as transistor condition, temperature, and humidity. As a result, the oscillation frequency of the oscillator considerably varies.

Thus, the ring oscillator 22B is provided as an oscillating circuit which outputs rectangular-wave signals having frequency variations.

Figure 14:
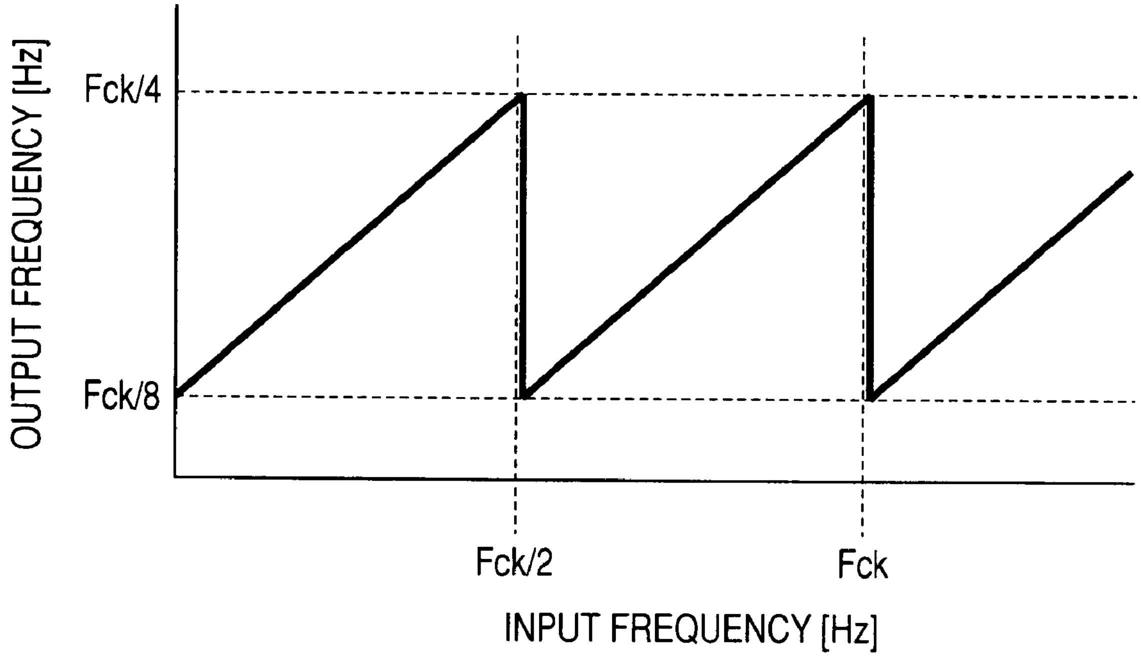
FIG. 14 shows input/output frequency characteristics of a frequency division correction system according to the second embodiment.

The frequency division correction system 167 is a frequency dividing circuit group providing output characteristics shown in FIG. 14 for input pulse frequencies.

The frequency division correction system 167 counts the input pulse within one cycle of the horizontal synchronizing signal HSYNC and selects the optimum output frequency. By this step, variations of the output frequency of the ring oscillator (oscillator) 22B are limited to a fixed frequency range.

The master clock MCK is a pulse having a frequency Fck incapable of converting the level from VDDI to VDD on the substrate, and the clock CK1B is a pulse having a frequency Fck/2 and asynchronous with the master clock MCK having the VDD amplitude.

According to the DC-DC converter 160B, the switch 162 is turned on and the switch 163 is turned off when the clock select signal SELMCK is at a low level. In this case, the level shifter 161 is reset and the ring oscillator 22B is operated.

On the other hand, the switch 162 is turned off and the switch 163 is turned on when the clock select signal SELMCK is at a high level. In this case, the ring oscillator 22B is reset and the level shifter 161 is operated.

In the DC-DC converter 160B, the clock CK1 is supplied to the boosting circuit 165 at the time of stop of the circuit groups connected with the DC-DC converter and the low-level clock select signal SELMCK. The boosting circuit 165 boosts the voltage in response to the clock CK1 as a boosting pulse to obtain the stable voltage output VDD2.

Thus, a high-frequency boosting pulse sufficient for driving the frequency dividing circuit can be obtained by converting the level of the clock CK2 from VDDI to VDD using the stable output VDD2 from the DC-DC converter 160B.

In this case, the clock select signal SELMCK is set at a high level, and the clock CK2 is supplied to the boosting circuit 165 through the switch 163 and the frequency division correction system 167. The boosting circuit 165 boosts the voltage according to the clock CK2 as a boosting pulse, and starts the connected circuit groups to obtain the desired current supply capacity and voltage output VDD2.

According to the second embodiment, the DDC frequency scarcely changes before and after switching since the output frequency is limited to a certain fixed frequency range by the frequency division correction system 167. Thus, the stable DC voltage output VDD2 can be obtained approximately independent of the boosting pulse source.

While the active matrix type liquid crystal display device has been described in the above embodiments, the display device provided according to an embodiment of the invention may be other types of active matrix type display device such as an EL display device which uses electroluminescence (EL) elements as electro-optic element for respective pixels.

Moreover, the active matrix type display device provided according to an embodiment of the invention and represented by the active matrix type liquid crystal display devices in the above embodiments is applicable to displays contained in personal computers, OA equipment such as word processors, television receivers, and other devices. The display device provided according to an embodiment of the invention is particularly appropriate for display units of mobile terminals such as cellular phones and PDA whose bodies have been increasingly downsized and made compact.

Figure 15:
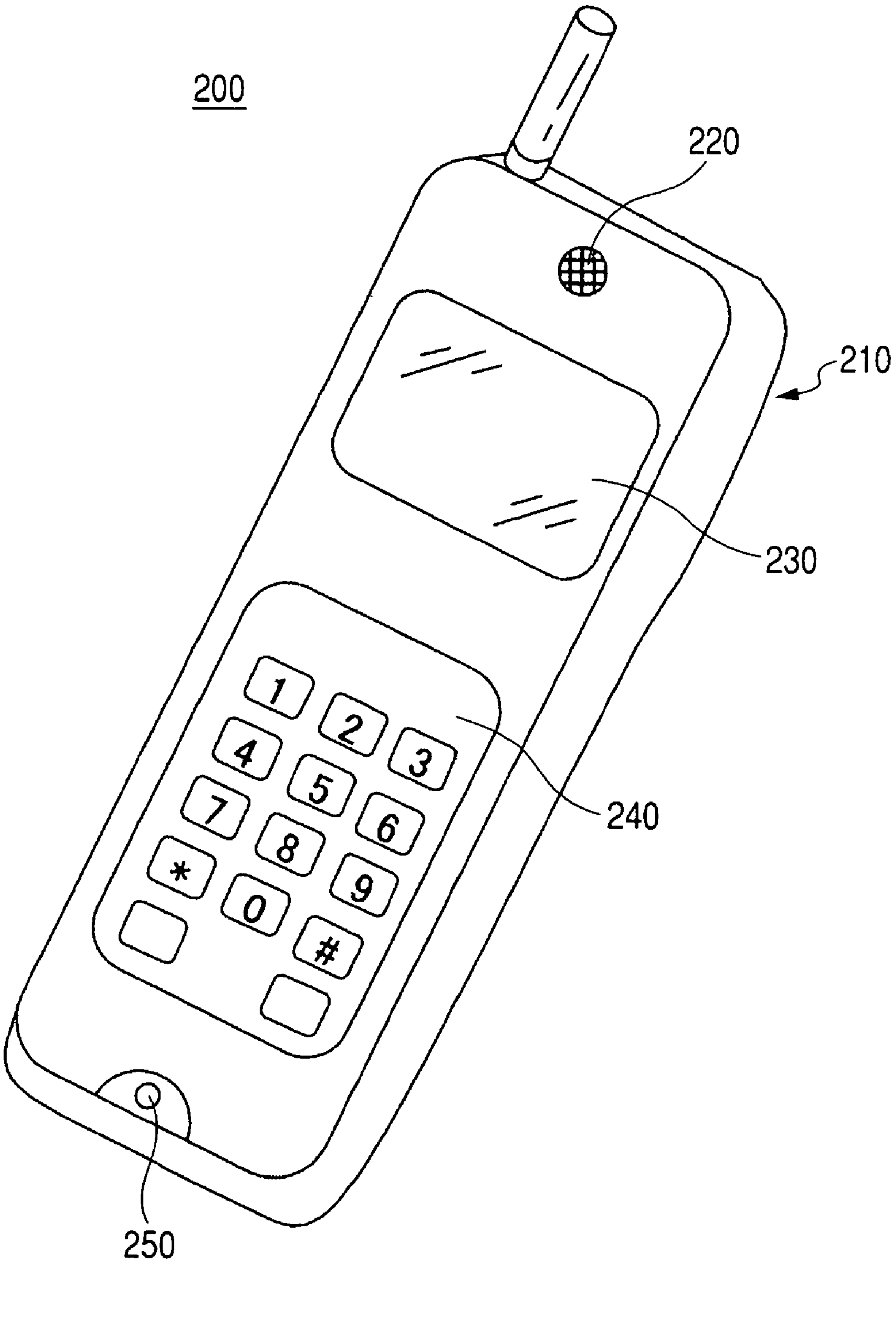
FIG. 15 illustrates an external appearance of a general structure of a cellular phone as a mobile terminal according to an embodiment of the invention.

FIG. 15 illustrates an external appearance of a general structure of a mobile terminal such as a cellular phone which includes the display device provided according to an embodiment of the invention.

A cellular phone 200 in this example includes a speaker unit 220, a display unit 230, an operation unit 240, and a microphone unit 250 disposed on the front surface of a device housing 210 in this order from the upper side.

According to the cellular phone having this structure, the display unit 230 has a liquid crystal display device, for example, and this liquid crystal display device uses the active matrix type liquid crystal display device according to one of the above embodiments.

When one of the active matrix type liquid crystal display devices according to the above embodiments is used as the display unit 230 in the mobile terminal such as a cellular phone, frequency variations of output from the oscillator can be limited to a fixed, guaranteed range. In addition, since the circuit block is constituted and controlled independent of voltage and frequency of the interface, the circuit integrated type liquid crystal display device appropriate for low-voltage and high-frequency type interface can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A power circuit, comprising:

a frequency dividing circuit driven by a source voltage to divide frequency of a first signal to which at least a level shift processing has been applied;

a boosting circuit driven by a source voltage to boost the voltage according to at least one of an output signal from the frequency dividing circuit and a second signal having a lower frequency than that of the first signal as a boosting pulse;

a level shifter that shifts the level of the first signal by an output voltage from the boosting circuit; and a switching unit that complementarily inputs an output signal from the level shifter to the frequency dividing circuit and the second signal to the frequency dividing circuit or the boosting circuit, wherein the first signal has a first amplitude, and the second signal has a second amplitude equal to or larger than the first amplitude and equal to or lower than the level of the source voltage which includes the first amplitude, and the switching unit obtains a boosted voltage output from the boosting circuit after a boosting operation performed by the boosting circuit having received the second signal, inputs the boosted voltage output to the level shifter such that the level shifter can execute level conversion of the first signal, and stops the boosting operation performed according to the second signal, thereafter inputting the level-shifted first signal to the boosting circuit via the frequency dividing circuit to obtain final boosted voltage.

2. The power circuit according to claim 1, wherein:

before starting a circuit to which a boosted voltage output from the boosting circuit is inputted, the switching unit obtains a boosted voltage output from the boosting circuit by a boosting operation performed by the boosting circuit after the boosting circuit receives the second signal, inputs the boosted voltage output to the level shifter which executes level conversion of the first signal, and stops the boosting operation performed according to the second signal, thereafter inputting the level-shifted first signal to the boosting circuit via the frequency dividing circuit.

3. The power circuit according to claim 2, wherein:

the first signal is a high-frequency pulse incapable of converting the level from the first amplitude level to the source voltage level; and the second signal is a low-frequency pulse capable of converting the level from the first amplitude level to the source voltage level.

4. The power circuit according to claim 3, wherein:

the first signal is a master clock supplied from the outside; and the second signal is a horizontal synchronizing signal of a video signal.

5. The power circuit according to claim 1, wherein the second signal is inputted to the frequency dividing circuit via the switching unit.

6. The power circuit according to claim 1, wherein:

the second signal whose frequency has been divided is supplied to the switching unit; and the switching unit inputs the frequency-divided second signal to the boosting circuit.

7. The power circuit according to claim 1, further comprising:

a low temperature polysilicon thin film transistor provided on an insulating substrate; and an oscillator that generates a pulse signal having a frequency variation, wherein the second signal is an oscillation output from the oscillator and is supplied to the frequency dividing circuit by the switching unit, and the frequency dividing circuit has a function of correcting frequency variation.

8. A display device, comprising:

a display unit on which pixels are disposed in a matrix;

a driving circuit that drives the display unit; and a power circuit that generates an internal driving voltage, wherein the power circuit includes a frequency dividing circuit driven by a source voltage to divide the frequency of a first signal to which at least a level shift processing has been applied, a boosting circuit driven by a source voltage to boost the voltage according to at least one of an output signal from the frequency dividing circuit and a second signal having a lower frequency than that of the first signal as a boosting pulse, a level shifter that shifts the level of the first signal by an output voltage from the boosting circuit, and a switching unit that complementarily inputs an output signal from the level shifter to the frequency dividing circuit and the second signal to the frequency dividing circuit or the boosting circuit, wherein the first signal has a first amplitude, and the second signal has a second amplitude equal to or larger than the first amplitude and equal to or lower than the level of the source voltage which includes the first amplitude, and the switching unit obtains a boosted voltage output from the boosting circuit after a boosting operation performed by the boosting circuit having received the second signal, inputs the boosted voltage output to the level shifter such that the level shifter can execute a level conversion of the first signal, and stops the boosting operation performed according to the second signal, thereafter inputting the level-shifted first signal to the boosting circuit via the frequency dividing circuit to obtain a final boosted voltage.

9. The display device according to claim 8, wherein:

the first signal is a master clock supplied from the outside; and the second signal is a horizontal synchronizing signal of a video signal.

10. The display device according to claim 8, further including:

a low temperature polysilicon thin film transistor provided on an insulating substrate; and an oscillator that generates a pulse signal having a frequency variation, wherein the second signal is an oscillation output from the oscillator and is supplied to the frequency dividing circuit by the switching unit, and the frequency dividing circuit has a function of correcting frequency variation.

11. A mobile terminal comprising a display device, wherein the display device includes:

a display unit on which pixels are disposed in a matrix;

a driving circuit that drives the display unit; and a power circuit that generates an internal driving voltage, wherein the power circuit includes a frequency dividing circuit driven by a source voltage to divide the frequency of a first signal to which at least a level shift processing has been applied, a boosting circuit driven by a source voltage to boost the voltage according to at least one of an output signal from the frequency dividing circuit and a second signal having a lower frequency than that of the first signal as a boosting pulse, a level shifter that shifts the level of the first signal by an output voltage from the boosting circuit, and a switching unit that complementarily inputs an output signal from the level shifter to the frequency dividing circuit and the second signal to the frequency dividing circuit or the boosting circuit, wherein the first signal has a first amplitude, and the second signal has a second amplitude equal to or larger than the first amplitude and equal to or lower than the level of the source voltage which includes the first amplitude, and the switching unit obtains a boosted voltage output from the boosting circuit after a boosting operation performed by the boosting circuit having received the second signal, inputs the boosted voltage output to the level shifter such that the level shifter can execute a level conversion of the first signal, and stops the boosting operation performed according to the second signal, thereafter inputting the level-shifted first signal to the boosting circuit via the frequency dividing circuit to obtain a final boosted voltage.

* * * * *